United States Patent
Shukutani et al.

(10) Patent No.: US 12,084,292 B2
(45) Date of Patent: Sep. 10, 2024

(54) MOBILE BODY POSITIONING STATION AND MOBILE BODY POSITIONING SYSTEM

(71) Applicant: MITSUBISHI HEAVY INDUSTRIES, LTD., Tokyo (JP)

(72) Inventors: Koji Shukutani, Tokyo (JP); Ken Onishi, Tokyo (JP); Noriko Onishi, Tokyo (JP); Hiroyoshi Okazaki, Tokyo (JP); Hiroyoshi Kojima, Tokyo (JP); Syuhei Kobori, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 895 days.

(21) Appl. No.: 15/734,049

(22) PCT Filed: Feb. 26, 2019

(86) PCT No.: PCT/JP2019/007392
§ 371 (c)(1),
(2) Date: Dec. 1, 2020

(87) PCT Pub. No.: WO2019/235000
PCT Pub. Date: Dec. 12, 2019

(65) Prior Publication Data
US 2021/0216078 A1  Jul. 15, 2021

(30) Foreign Application Priority Data
Jun. 6, 2018  (JP) .................................. 2018-109057

(51) Int. Cl.
*B65G 47/22*   (2006.01)
*B60L 53/36*   (2019.01)
(Continued)

(52) U.S. Cl.
CPC .............. *B65G 47/22* (2013.01); *B60L 53/36* (2019.02); *B65G 17/18* (2013.01); *B65G 39/18* (2013.01);
(Continued)

(58) Field of Classification Search
CPC ...... B65G 47/22; B65G 17/18; B65G 41/006; B65G 39/18; B65G 13/11; B60L 53/36;
(Continued)

(56) References Cited

U.S. PATENT DOCUMENTS 2,128,594 A    8/1938  Rasmussen
7,040,478 B2 *  5/2006  Ehlert ................... B65G 13/10
                                                198/370.09

(Continued)

FOREIGN PATENT DOCUMENTS

EP    0 125 331 A1   11/1984
EP    1 375 389 A1    1/2004
(Continued)

OTHER PUBLICATIONS

Extended (Supplementary) European Search Report dated Jul. 19, 2021, issued in counterpart EP application No. 19815170.6. (7 pages).
(Continued)

*Primary Examiner* — Glenn F Myers
(74) *Attorney, Agent, or Firm* — WHDA, LLP

(57) ABSTRACT

A mobile body positioning station and a mobile body positioning system include a first partition, a second partition disposed along a direction intersecting an extending direction of the first partition, and a guide device as a guide disposed on a movement path of a robot as a mobile body. The guide device is disposed along an oblique direction with respect to the direction perpendicular to the extending direction of the first partition to extend from the first (Continued)

partition toward the second partition side. The guide device is configured to make the robot move in the oblique direction more easily than move in directions other than the oblique direction, and the guide device moves the robot along the first partition toward the second partition.

7 Claims, 12 Drawing Sheets

(51) Int. Cl.
    *B65G 17/18*     (2006.01)
    *B65G 39/18*     (2006.01)
    *B65G 41/00*     (2006.01)
    *B65G 13/11*     (2006.01)
    *F16H 57/00*     (2012.01)
    *G05B 19/418*     (2006.01)

(52) U.S. Cl.
    CPC ............ *B65G 41/006* (2013.01); *B65G 13/11* (2013.01); *F16C 2326/00* (2013.01); *F16H 2057/0093* (2013.01); *G05B 19/4189* (2013.01)

(58) Field of Classification Search
    CPC ........ G05D 2201/0207; G05B 19/4189; F16H 2057/0093; F16C 2326/00
    See application file for complete search history.

(56) References Cited

U.S. PATENT DOCUMENTS

2006/0249354 A1* 11/2006 Riddick ............... B65G 47/244
                                                    198/779
2010/0300836 A1* 12/2010 Fourney ................ B65G 47/28
                                                    198/443
2020/0108414 A1* 4/2020 Sturm ....................... B07C 5/02

FOREIGN PATENT DOCUMENTS

| JP | 10-4638 A | 1/1998 |
| JP | 2012-188042 A | 10/2012 |
| JP | 2013-230084 A | 11/2013 |
| JP | 2015-36172 A | 2/2015 |
| WO | 2016/039989 A1 | 3/2016 |

OTHER PUBLICATIONS

Office Action dated Aug. 24, 2022, issued in counterpart EP Application No. 19815170.6. (4 pages).

International Search Report dated May 28, 2019, issued in counterpart International Application No. PCT/JP2019/007392. (1 page).

* cited by examiner

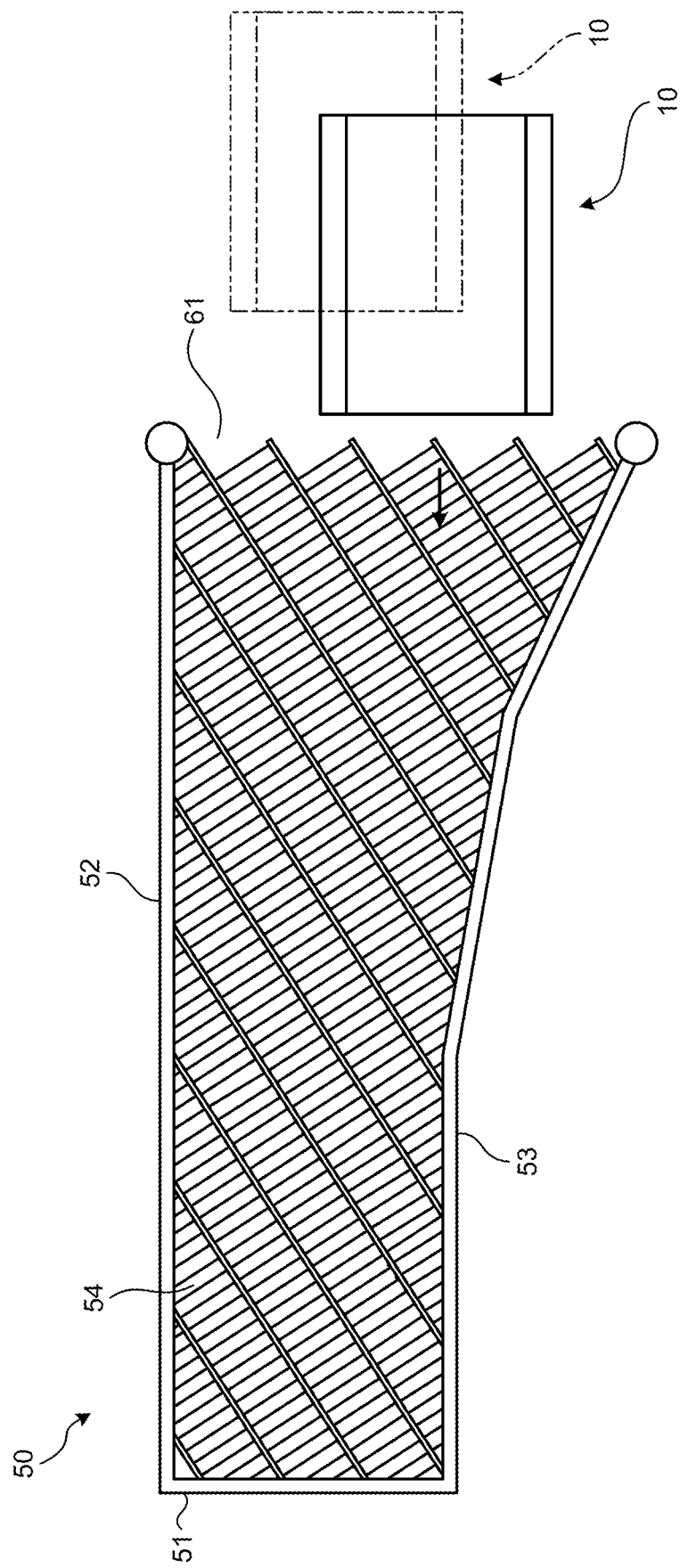

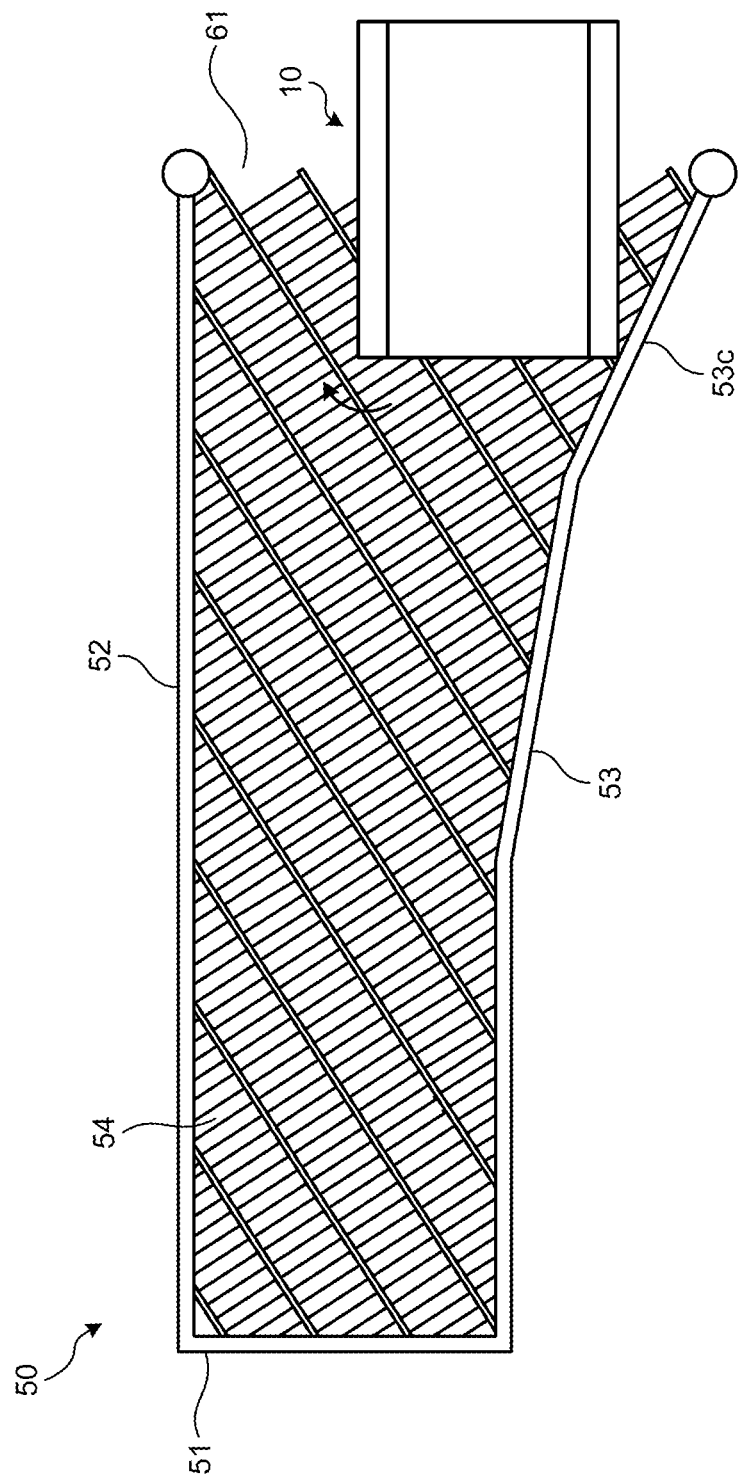

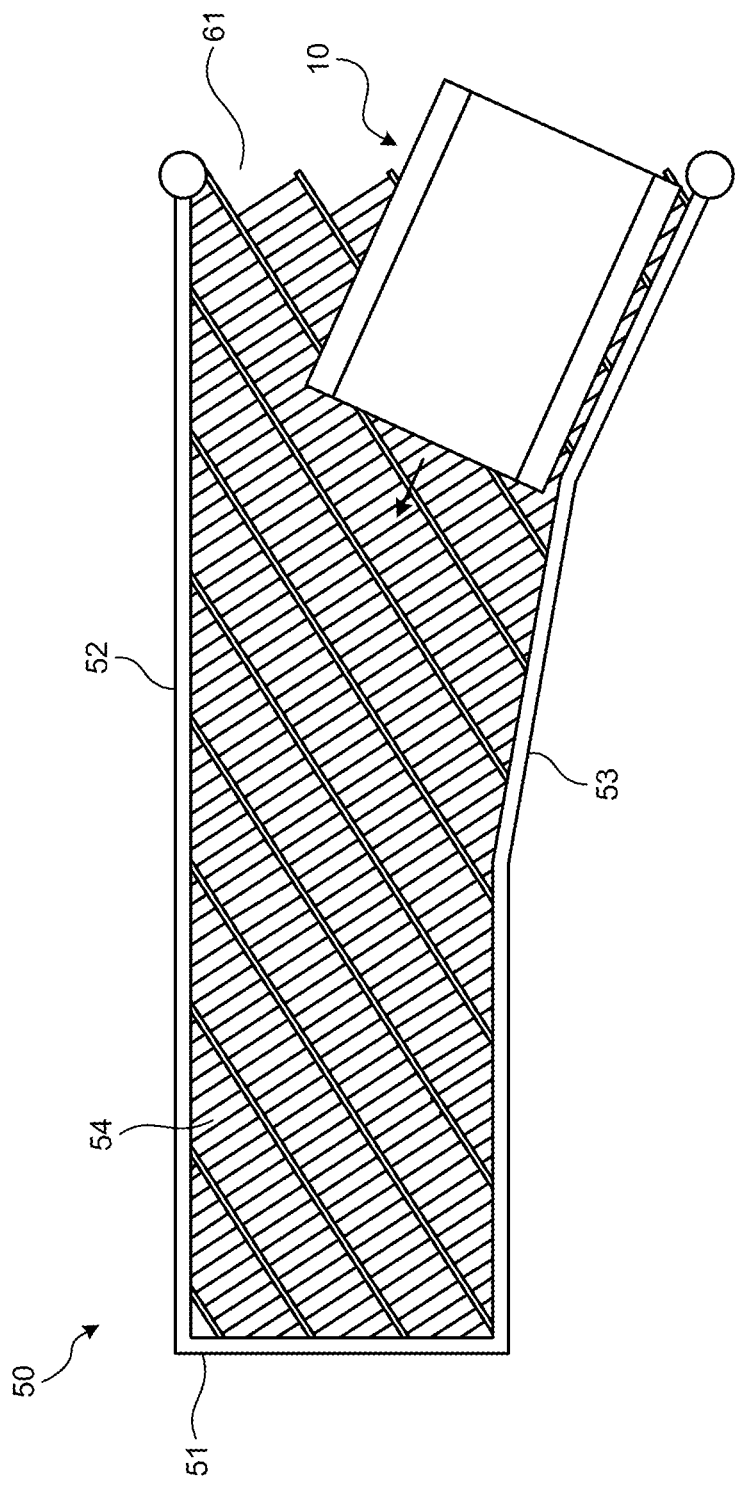

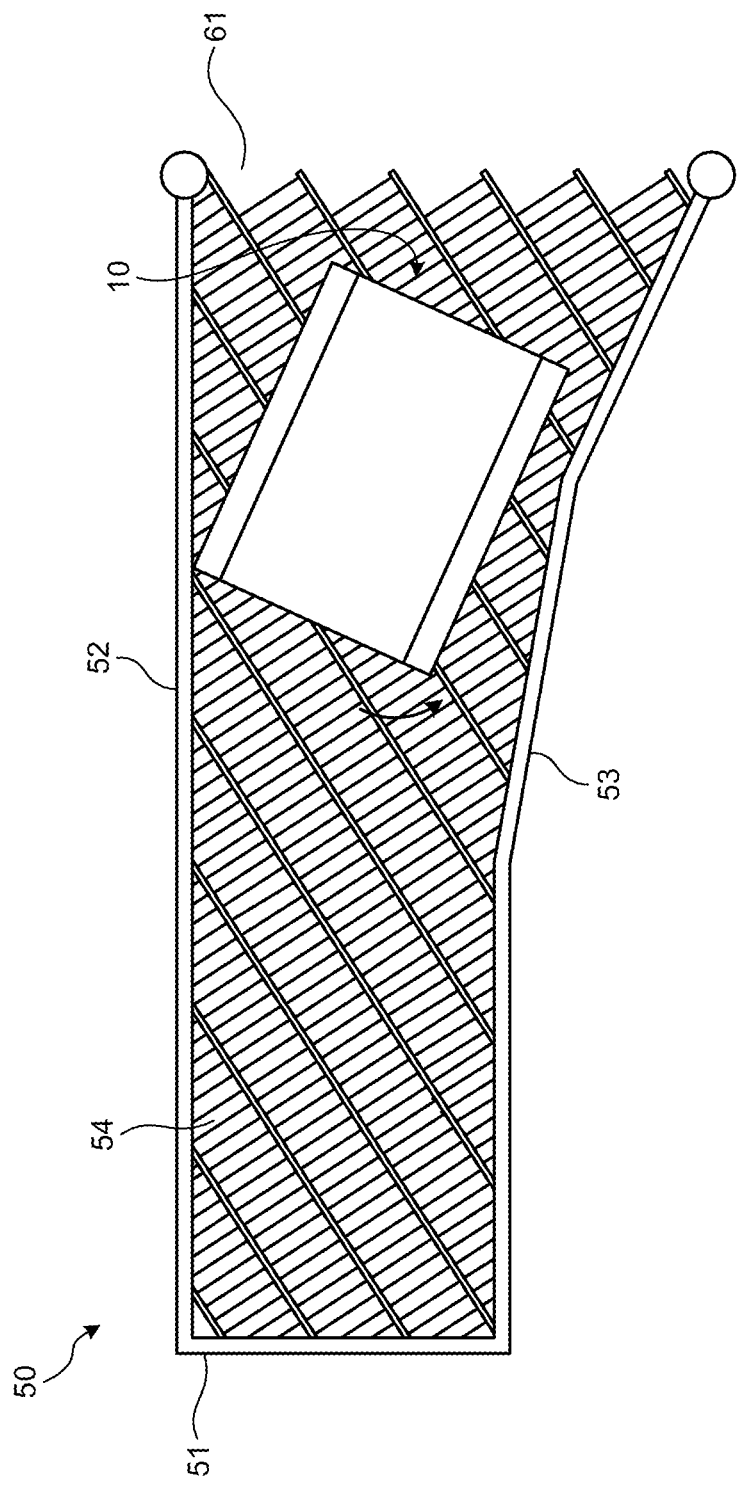

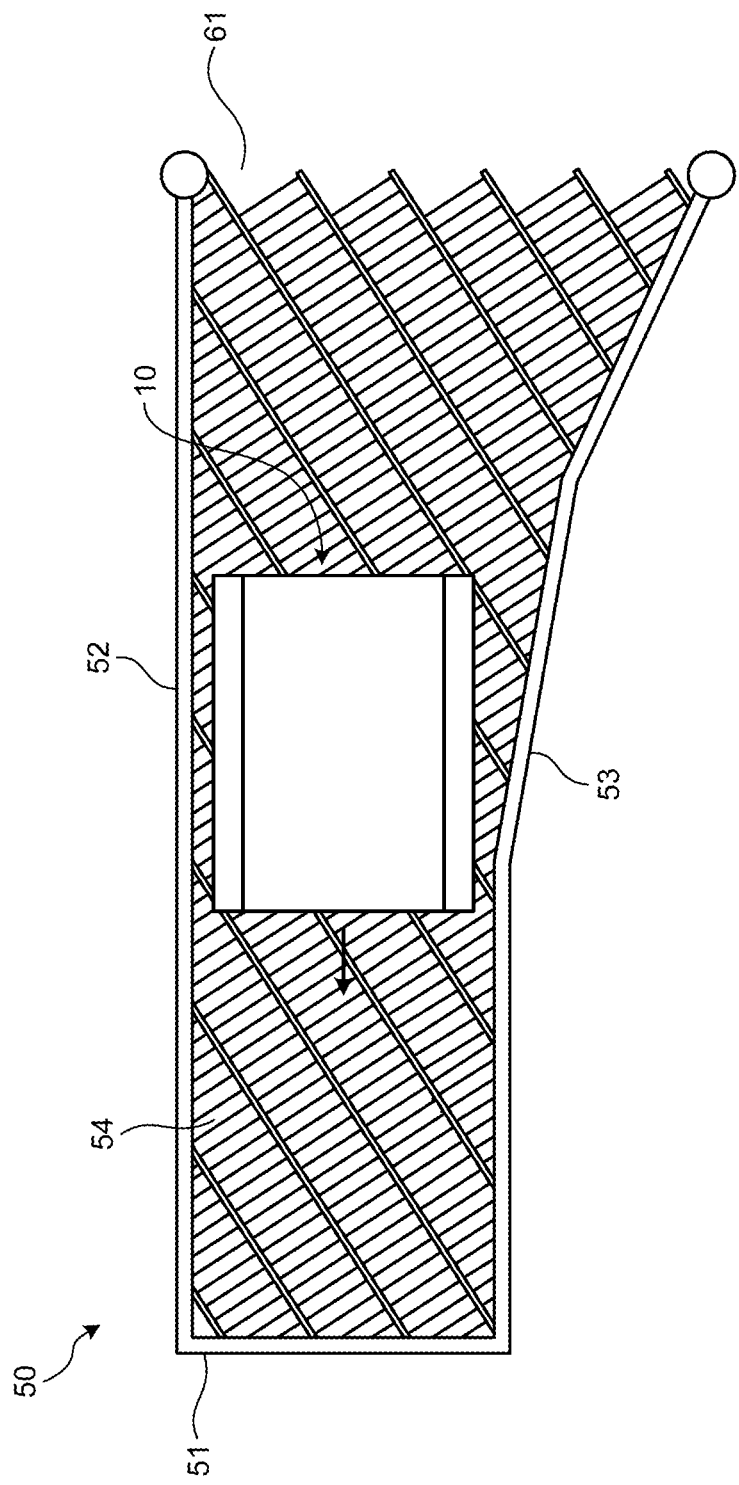

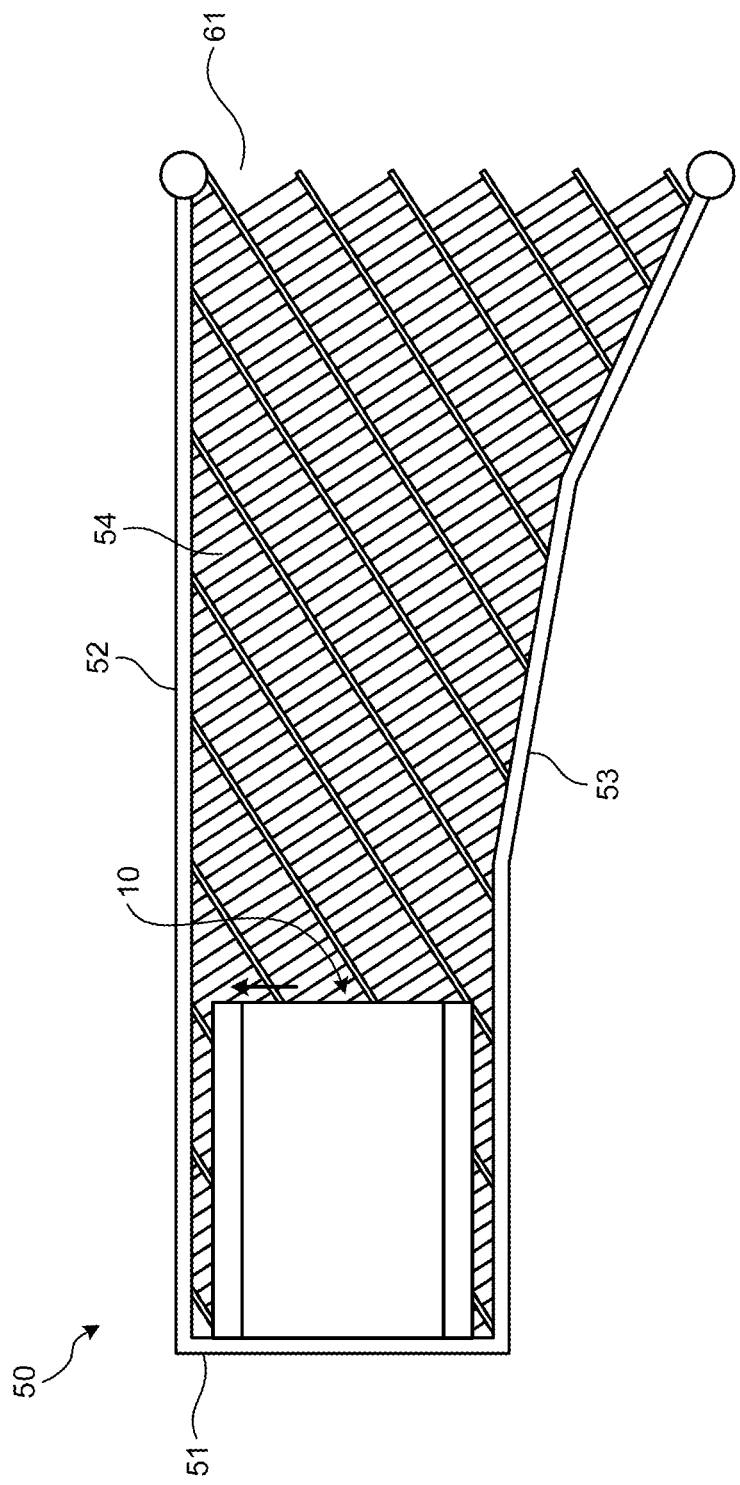

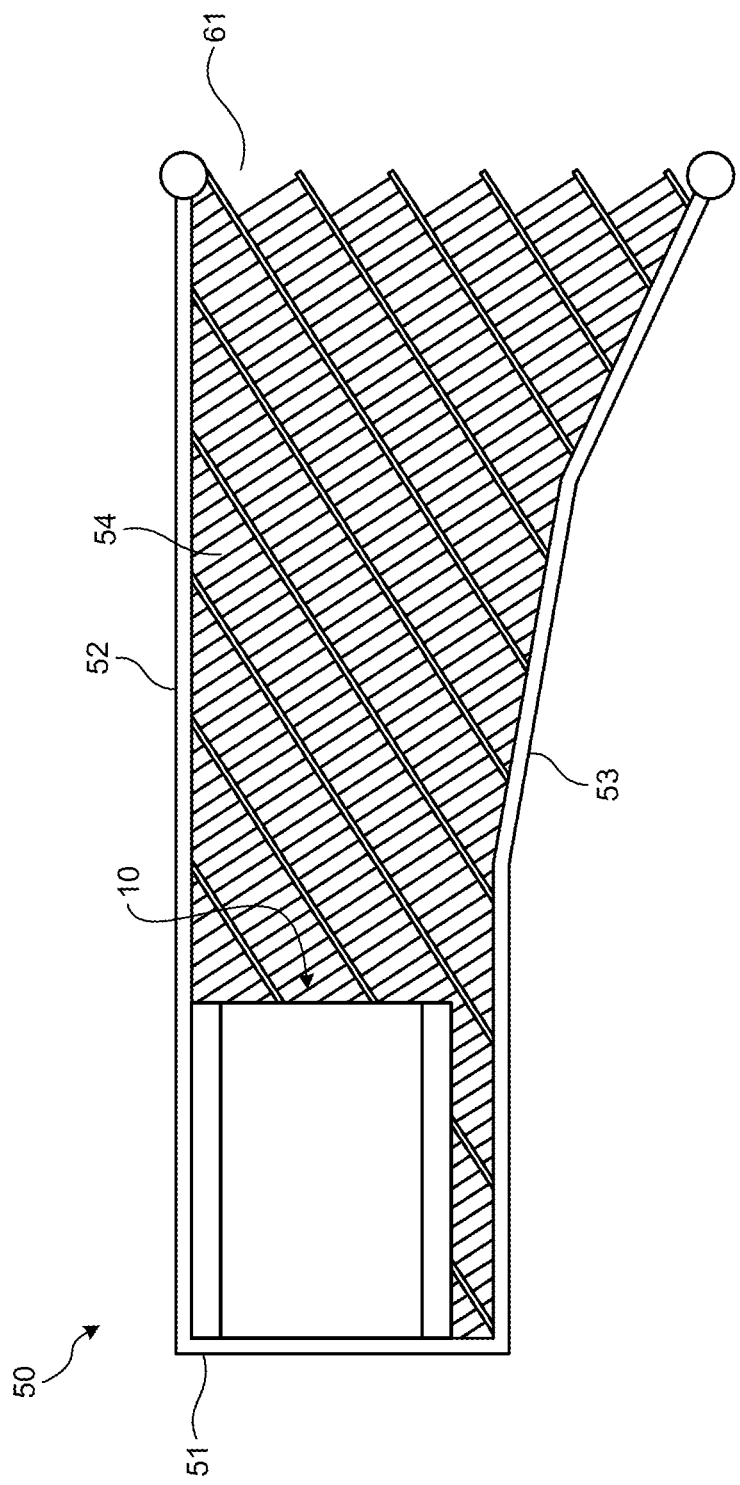

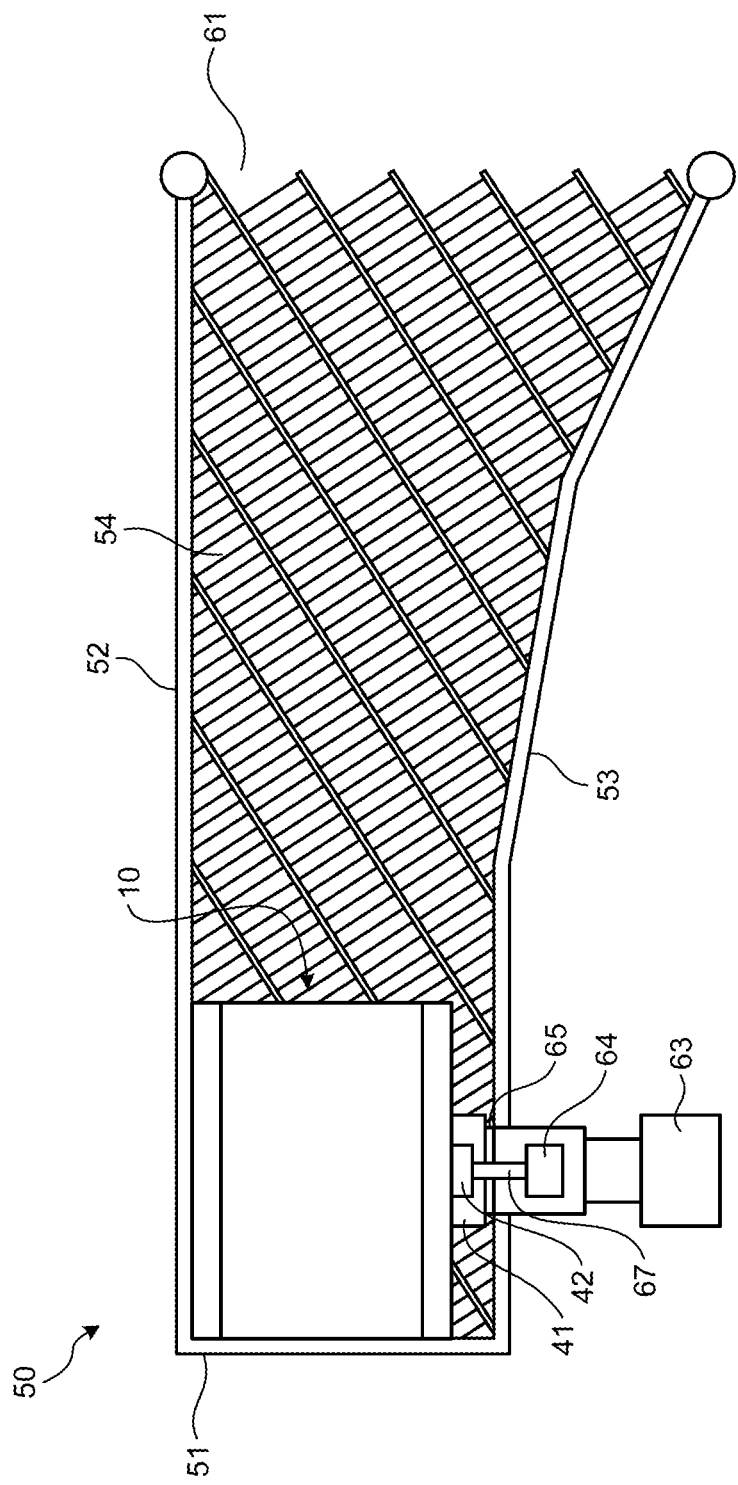

MOBILE BODY POSITIONING STATION AND MOBILE BODY POSITIONING SYSTEM

FIELD

The present invention relates to a mobile body positioning station and a mobile body positioning system that positions a movable mobile body at a predetermined position to perform various kinds of work.

BACKGROUND

In patrol inspection work or the like using a movable robot, the robot needs to perform various kinds of work, such as refueling and maintenance work. In this case, when performing patrol inspection work or the like, the robot is self-propelled to a station to perform these various kinds of work. When the patrol inspection work is performed in, for example, a petrochemical plant, if a substance such as petroleum leaks, the work environment of the robot will become an explosive atmosphere to cause a fire upon ignition with sparks generated at actuation of the robot. Consequently, in this case, the robot needs to have an explosion-proof structure.

For example, an explosion-proof structure of a conventional robot is described in Patent Literature 1 below. An industrial robot described in Patent Literature 1 includes a control device, a battery, and a motor that are disposed on a movable frame, and has an internal pressure explosion-proof structure in which air is supplied into the frame from an air supply device so as to maintain the inside the frame at a pressure higher than a predetermined pressure.

CITATION LIST

Patent Literature

Patent Literature 1: JP 2015-036172 A

SUMMARY

Technical Problem

When the movable robot as described above is self-propelled to a station and performs various kinds of work, there is need to position the robot at a predetermined position. In this case, it is conceivable to provide a detection sensor in the robot or station and control and determine a position of the robot based on the detection result obtained by the detection sensor. However, this may unfortunately complicate configurations of the robot or station.

The present invention has been made to solve the above-described problem, and an object of the present invention is to provide a mobile body positioning station and a mobile body positioning system that have simplified configurations.

Solution to Problem

To achieve the object described above, a mobile body positioning station according to the present invention includes a first partition; a second partition disposed along a direction intersecting an extending direction of the first partition; and a guide disposed on a movement path of a mobile body. The guide is disposed along an oblique direction with respect to a direction perpendicular to the extending direction of the first partition to extend from the first partition toward the second partition side. The guide is configured to make the mobile body move in the oblique direction more easily than move in directions other than the oblique direction, and the guide is configured to move the mobile body along the first partition toward the second partition.

Consequently, when the mobile body moves and a front end in a moving direction comes into contact with the first partition, the mobile body stops moving and the positioning at the front is done. Then, the guide guides the mobile body toward the second partition along the oblique direction in which the mobile body moves easily. When one side of the mobile body comes into contact with the second partition, the guide stops guiding the mobile body, and the positioning at the one side of the mobile body is done. Thus, no sensor to detect the mobile body is needed so that the configuration can be simplified.

In the mobile body positioning station according to the present invention, the guide is configured to cause the mobile body to move along the first partition toward the second partition after the mobile body comes into contact with the first partition.

Consequently, after the mobile body comes into contact with the first partition, the guide causes the mobile body to move toward the second partition so that the mobile body can be positioned with the simple configuration.

In the mobile body positioning station according to the present invention, the guide is configured to cause the mobile body to move toward the second partition with use of movement driving force of the mobile body.

Consequently, the movement driving force of the mobile body can make the guide function to efficiently move and guide the mobile body toward the second partition.

In the mobile body positioning station according to the present invention, the oblique direction is a direction inclined at a predetermined acute angle set in advance with respect to an extending direction of the second partition.

Consequently, the oblique direction is the direction inclined at the predetermined acute angle with respect to the extending direction of the second partition so that the movement driving force of the mobile body can be transmitted to the guide to efficiently guide the mobile body toward the second partition and position the mobile body.

In the mobile body positioning station according to the present invention, the oblique direction is set in a range equal to or larger than 15 degrees and smaller than 90 degrees.

Consequently, setting of the oblique direction in the appropriate range makes it possible to position the mobile body appropriately.

In the mobile body positioning station according to the present invention, the first partition and the second partition are disposed in such a manner that the extending direction of the first partition and an extending direction of the second partition make a right angle.

Consequently, the first partition and the second partition are disposed to make a right angle so that the mobile body that has come into contact with the first partition can be appropriately positioned, and that the mobile body that has come into contact with the second partition can be appropriately positioned.

In the mobile body positioning station according to the present invention, the guide comprises a plurality of guide rollers disposed along the oblique direction, rotary center axes of the guide rollers extend along a direction intersecting the oblique direction, and the guide rollers are disposed in parallel to one another.

Consequently, the guide rollers are provided as the guide, and the guide rollers are disposed along the oblique direction and in parallel to one another so that rotational force of the guide rollers can efficiently move and guide the mobile body toward the second partition.

In the mobile body positioning station according to the present invention, the guide includes a plurality of guide rollers. The guide rollers includes: a pair of support plates; and at least one roller main body. The pair of support plates is disposed along the oblique direction. The at least one of roller main bodies is rotatably disposed by a rotary shaft perpendicular to the support plates.

Consequently, the rotational force of the guide rollers can efficiently move and guide the mobile body toward the second partition.

The mobile body positioning station according to the present invention further includes: a third partition facing the second partition and disposed along a direction intersecting the extending direction of the first partition; and an entrance port of the mobile body defined between an end portion of the second partition in the extending direction and an end portion of the third partition in the extending direction. A distance between the second partition and the third partition increases from the first partition toward the entrance port.

Consequently, the entrance port is defined between the end portion of the second partition and the end portion of the third partition, and the distance between the second partition and the third partition increases from the first partition toward the entrance port. Thus, even when an entrance position of the mobile body with respect to the entrance port is deviated in a width direction, the entrance port can appropriately guide the mobile body inside.

The mobile body positioning station according to the present invention further includes a power feeding device for the mobile body disposed on the third partition.

Consequently, with the power feeding device being disposed on the third partition, power feeding with respect to the mobile body that has come into contact with the first partition and the second partition and been positioned is performed from the third partition opposed to the second partition, so that the mobile body can be prevented from being deviated due to coupling of the power feeding device, thereby appropriately performing power feeding.

The mobile body positioning station according to the present invention further includes an air replenishment device for the mobile body disposed on the third partition.

Consequently, with the air replenishment device being disposed on the third partition, air replenishment with respect to the mobile body that has come into contact with the first partition and the second partition and been positioned is performed from the third partition opposed to the second partition so that the mobile body can be prevented from being deviated due to coupling of the air replenishment device, thereby appropriately performing air replenishment.

A mobile body positioning system according to the present invention includes: a control device configured to control movement of the mobile body capable of being self-propelled; and the mobile body positioning station described above. The control device stops movement of the mobile body when a predetermined period of time has elapsed after the mobile body comes into contact with the first partition.

Consequently, after the moving mobile body comes into contact with the first partition and the positioning at the front is done, the guide guides the mobile body toward the second partition along the oblique direction in which the mobile body moves easily, and the mobile body comes into contact with the second partition so that the positioning at one side is done. At this time, the mobile body stops moving when the predetermined period of time has elapsed after the mobile body came into contact with the first partition so that the mobile body can be positioned at an appropriate position.

Advantageous Effects of Invention

The mobile body positioning station and the mobile body positioning system according to the present invention can simplify the configurations.

BRIEF DESCRIPTION OF DRAWINGS

FIG. 5 is a schematic diagram illustrating positioning behaviors of the mobile body at the positioning station.

FIG. 6 is a schematic diagram illustrating a positioning behavior of the mobile body at the positioning station.

FIG. 7 is a schematic diagram illustrating a positioning behavior of the mobile body at the positioning station.

FIG. 8 is a schematic diagram illustrating a positioning behavior of the mobile body at the positioning station.

FIG. 9 is a schematic diagram illustrating a positioning behavior of the mobile body at the positioning station.

FIG. 10 is a schematic diagram illustrating a positioning behavior of the mobile body at the positioning station.

FIG. 11 is a schematic diagram illustrating a positioning behavior of the mobile body at the positioning station.

FIG. 12 is a schematic diagram illustrating a positioned state of the mobile body at the positioning station.

DESCRIPTION OF EMBODIMENTS

Hereinafter, a preferred embodiment of a mobile body positioning station and a mobile body positioning system according to the present invention will be described in detail with reference to the accompanying drawings. The invention is not limited by the present embodiment, and that when there are a plurality of embodiments, the invention encompasses a combination of the embodiments.

In an equipment to perform patrol inspection work by a mobile body moving in a petrochemical plant, for example, the mobile body positioning station and the mobile body positioning system according to the present embodiment position the mobile body at a predetermined position for an operation such as feeding power to the mobile body. If petroleum or the like leaks in the petrochemical plant, a work environment of the mobile body becomes an explosive atmosphere. Therefore, the mobile body has an explosion-proof structure.

Figure 1:
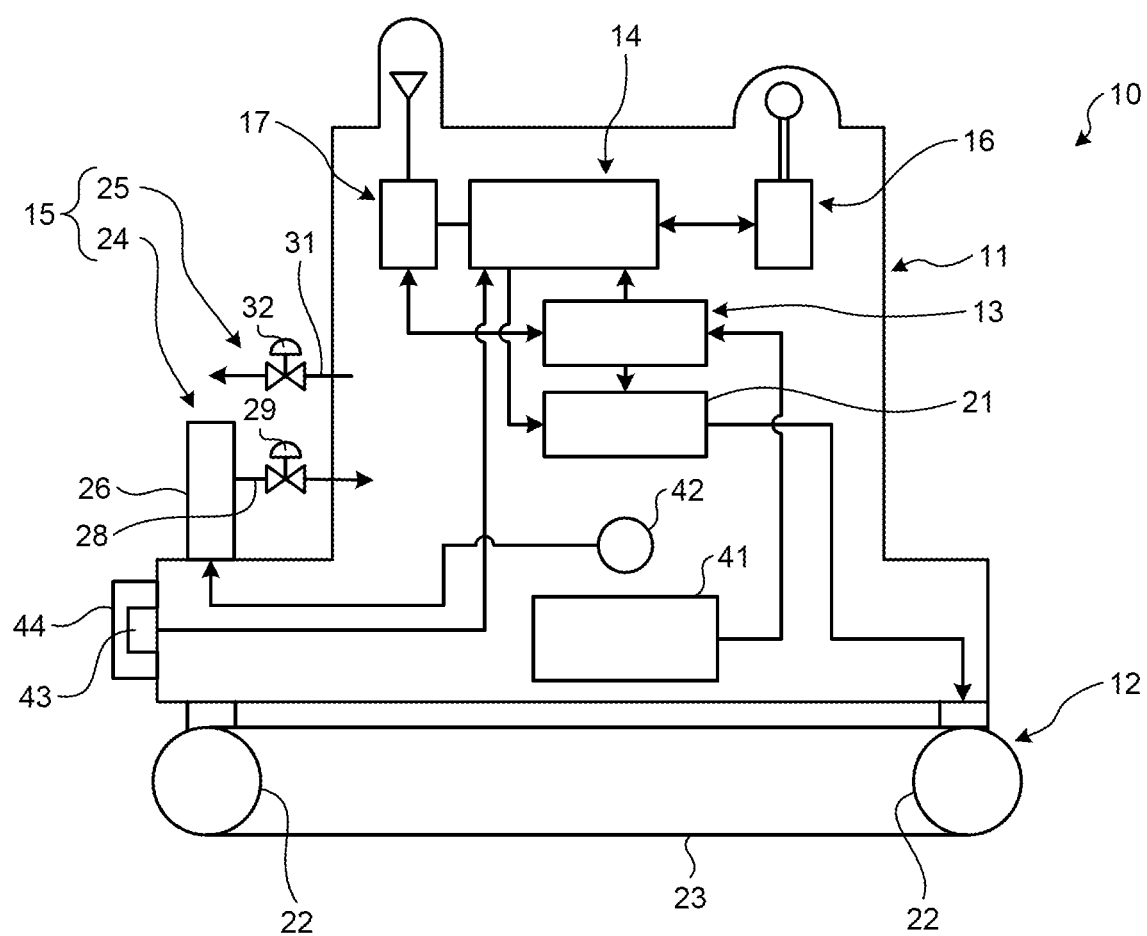
FIG. 1 is a schematic side view of a mobile body according to the embodiment.

First, a robot as the mobile body will be described. FIG. 1 is a schematic side view of the mobile body according to the embodiment, and FIG. 2 is a schematic plan view of the mobile body.

Figure 2:
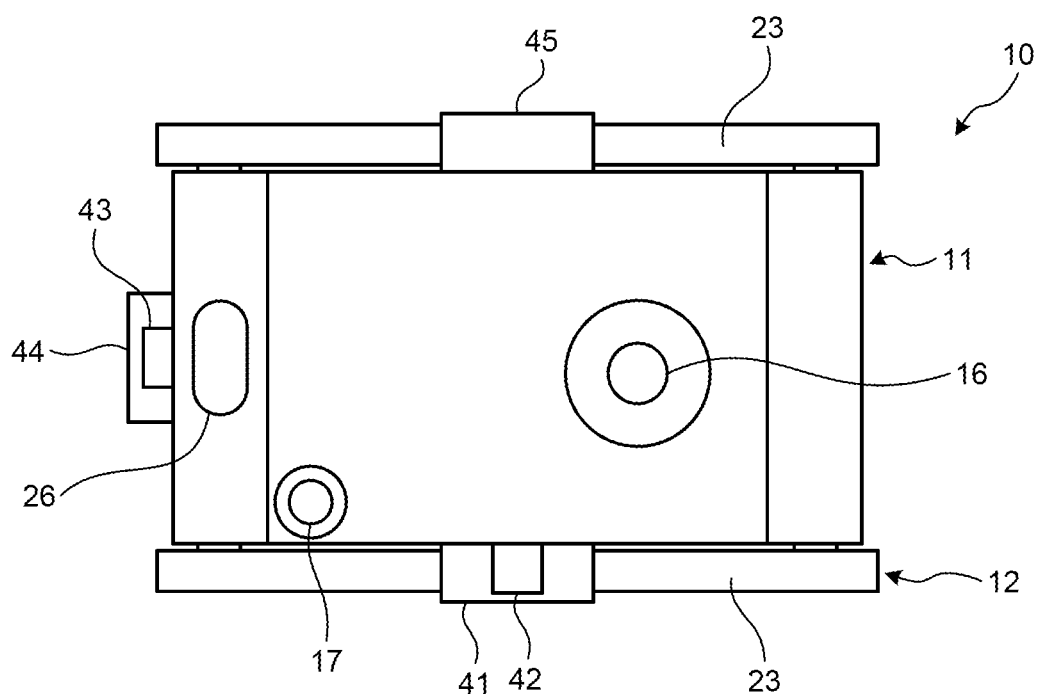
FIG. 2 is a schematic plan view of the mobile body.

In the present embodiment, as illustrated in FIG. 1 and FIG. 2, a robot (the mobile body) 10 includes a frame 11, a movement device 12, a battery 13, a control device 14, an internal pressure explosion-proof device 15, a camera 16, and a communication device 17. It is noted that in FIG. 1, a right side is a front side of the robot, and that rightward movement is forward movement whereas leftward movement is rearward movement.

The frame 11 has a hollow box shape and a sealing structure. The movement device 12 is disposed under the frame 11 so that the frame 11 can move solely. The movement device 12 includes an electric motor 21, drive sprockets 22, and crawlers 23. The electric motor 21 is mounted in the frame 11. The drive sprockets 22 are attached to front and rear lower portions of the frame 11 on both sides, and the crawlers 23 are wound on the front and rear drive sprockets 22 on the left and the right. The movement device 12 is not limited to the four drive sprockets 22 and the crawlers 23 but may include a plurality of drive wheels instead.

The battery 13 and the control device 14 are mounted in the frame 11. The battery 13 is capable of supplying power to the control device 14 and the electric motor 21. The control device 14 drivingly controls the electric motor 21 so that forward movement, rearward movement and stopping of the frame 11, i.e., the robot 10, can be controlled using the movement device 12.

The internal pressure explosion-proof device 15 maintains pressure inside the frame 11 higher than pressure outside the frame 11 so as to prevent external gas from entering the inside of the frame 11. The internal pressure explosion-proof device 15 includes an air supplier 24 and an exhaust device 25. The air supplier 24 includes an air tank 26 disposed outside of the frame 11, and an air supply line 28 extending from the air tank 26 to the inside of the frame 11 through the frame 11. The air supply line 28 includes a pressure reducing valve 29 outside of the frame 11 and has an end portion opened. Thus, normally, pressurized air of the air tank 26 is supplied to the inside of the frame 11 through the air supply line 28, and the pressure reducing valve 29 maintains the internal pressure of the frame 11 at a constant set pressure higher than the external pressure of the frame 11.

The exhaust device 25 includes an air discharge line 31 penetrating the frame 11 and extending to the inside. The air discharge line 31 includes a relief valve 32 outside of the frame 11 and has an end portion opened. Therefore, when the temperature inside the frame 11 rises and the pressure inside the frame 11 becomes higher than the set pressure, the relief valve 32 causes air inside the frame 11 to be discharged to the outside through the air discharge line 31, thus decreasing the pressure inside the frame 11.

The camera 16 is mounted at an upper portion of the inside of the frame 11. Under control of the control device 14, the camera 16 is capable of capturing an outside image and outputs the captured image to the control device 14. The communication device 17 is capable of communicating with an external management room (not illustrated), for example. The communication device 17 sends the control device 14 information input from the outside, and also sends the outside information from the control device 14 such as the image captured by the camera 16.

The robot 10 includes a power feeding coupler 41 and an air replenishment coupler 42 that are disposed on the frame 11. The power feeding coupler 41 and the air replenishment coupler 42 are disposed on one side portion of the frame 11 along a vertical direction. The power feeding coupler 41 is coupled to the battery 13, and the air replenishment coupler 42 is coupled to the air tank 26.

The robot 10 includes a detector 43 at a rear end portion of the inside of the frame 11. A cover that covers the detector 43 from the outside functions as a first contact portion 44. During rearward movement of the robot 10, the detector 43 detects that the first contact portion 44 comes into contact with an obstacle and inputs a detection result to the control device 14. The robot 10 further includes a second contact portion 45 disposed on the other side portion of the frame 11.

The robot 10 includes an onboard protection monitoring device (not illustrated) to stop power supply from the battery 13 to the movement device (electric motor 21) 12, the control device 14, the camera 16, and the communication device 17 when the pressure inside the frame 11 becomes equal to or lower than the predetermined air pressure (a pressure at least higher than an atmospheric pressure) set in advance. Moreover, although not illustrated, the robot 10 may be equipped with a robot arm, for example.

The robot 10 configured as described above is capable of forward movement, rearward movement, and stopping through the control of the movement device 12 by the control device 14. The robot 10 can be steered by adjusting the speeds of the right and left crawlers 23 through the control of movement device 12 by the control device 14. In the robot 10, the control device 14 stores a patrol map and determines a moving route based on this map information and distance information detected by a sensor mounted on the robot 10. The robot 10 may determine a moving route in accordance with positional signals from the GPS.

The robot 10 needs to be subjected to power supply when the charged amount of the battery 13 has decreased through patrol inspection work or the like; and the robot 10 needs air replenishment when an amount of air (air pressure) in the air tank 26 has decreased. Therefore, in the present embodiment, a power feeding station (the positioning station) is disposed in a patrol inspection work zone.

Figure 3:
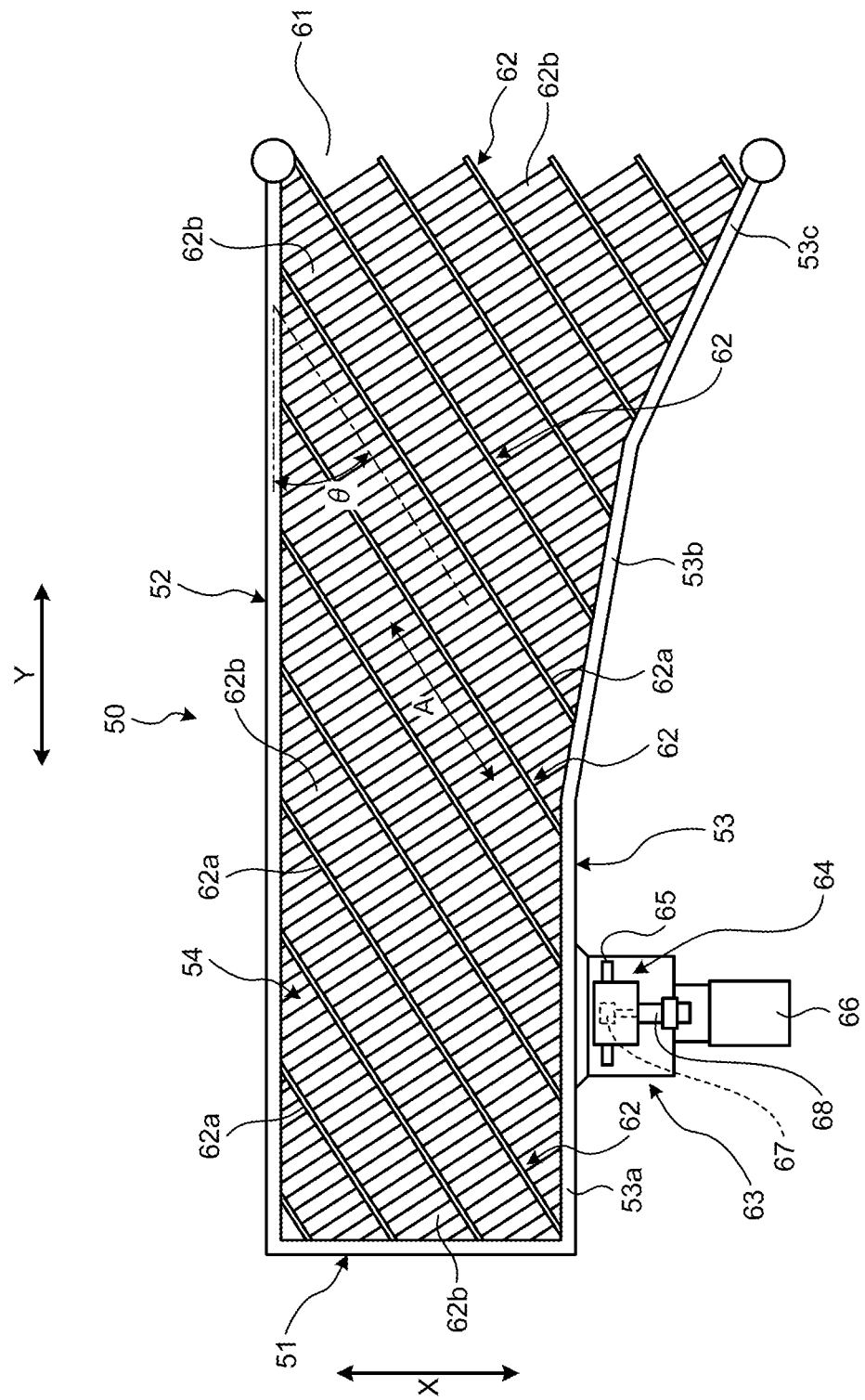
FIG. 3 is a plan view of a positioning station for the mobile body according to the embodiment.

Next, the power feeding station (the positioning station) will be described. FIG. 3 is a plan view of the positioning station for the mobile body according to the present embodiment, and FIG. 4 is a schematic diagram illustrating the mobile body positioned at the positioning station.

Figure 4:
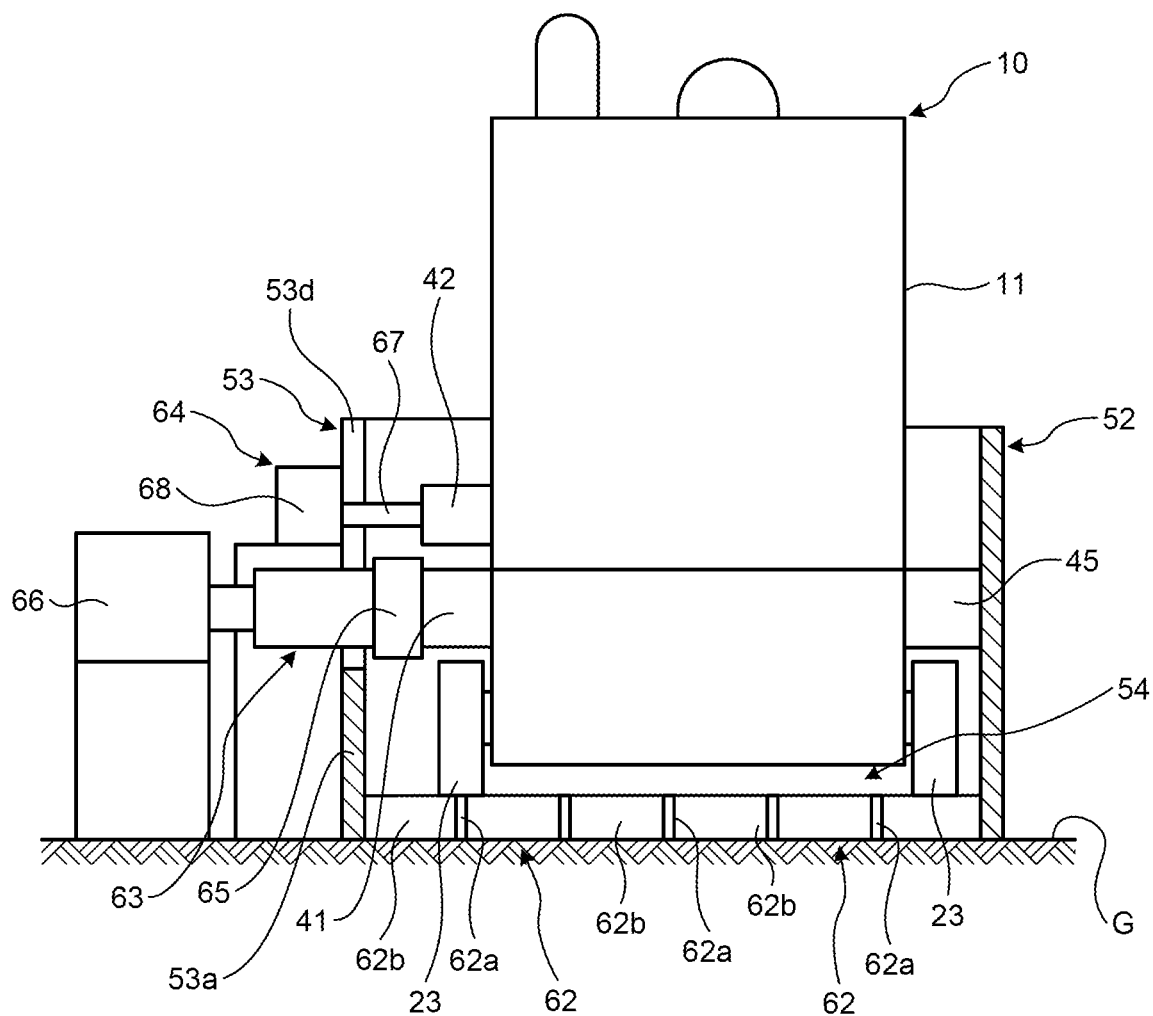
FIG. 4 is a schematic diagram illustrating the mobile body positioned at the positioning station.

In the present embodiment, as illustrated in FIG. 3 and FIG. 4, a power feeding station 50 includes a first partition 51, a second partition 52, a third partition 53, and a guide device (the guide) 54.

In the power feeding station 50, an entrance port 61 through which the robot 10 enters is defined by the second partition 52 continuously provided from one end of the first partition 51 and the third partition 53 continuously provided from the other end of the first partition 51. That is, an extending direction of the first partition 51 intersects (is perpendicular to) both an extending direction (one side of a Y direction) of the second partition 52 and an extending direction (the one side of the Y direction) of the third partition 53; and the extending direction (the one side of the Y direction) of the second partition 52 and the extending direction (the one side of the Y direction) of the third partition 53 are parallel to each other. The entrance port 61 is defined between an end portion of the second partition 52 in the extending direction and an end portion of the third partition 53 in the extending direction. The third partition 53 includes a straight portion 53a, a first oblique portion 53b, and a second oblique portion 53c, so that the entrance port 61 has a widened shape. The guide device 54 is disposed in a region surrounded by the first partition 51, the second partition 52, and the third partition 53.

The first partition 51 is disposed along the X direction perpendicular to the other side of the Y direction that is an entering direction of the robot 10 to the power feeding station 50, and the first partition 51 has a length slightly longer than a width of the robot 10. When the robot 10 moves rearward and enters the power feeding station 50, a rear end portion of the robot 10 comes into contact with the first partition 51 to position the robot 10 with respect to the Y direction. The second partition 52 is disposed along the other side of the Y direction that is the entering direction of the robot 10 to the power feeding station 50, and the second partition 52 has a length two times or more longer than a length of the robot 10. After the positioning of the robot 10 in the Y direction is performed by the first partition 51, and when the robot 10 moves toward the second partition 52, one side portion of the robot 10 comes into contact with the second partition 52 to position the robot 10 with respect to the X direction. The lengths of the first partition 51 and the second partition 52 are not limited to those in the present embodiment but may be made longer or shorter than those in the present embodiment.

The third partition 53 is disposed along the other side of the Y direction that is the entering direction of the robot 10 to the power feeding station 50, and the third partition 53 has a length two times or more longer than the length of the robot 10. When the robot 10 enters the power feeding station 50, the third partition 53 guides and makes the robot 10 move toward the first partition 51. The second partition 52 and the third partition 53 are parallel to each other. The first partition 51 and the second partition 52 make a right angle, and the first partition 51 and the third partition 53 make a right angle. Consequently, the power feeding station 50 has a U shape formed by the first partition 51, the second partition 52, and the third partition 53 in plan view. The end portion of the second partition 52 and the end portion of the third partition 53 define the entrance port 61 through which the robot 10 enters. In this case, a distance between the second partition 52 and the third partition 53 is set at a length slightly longer than the width of the robot 10. The straight portion 53a, the first oblique portion 53b, and the second oblique portion 53c that constitute the third partition 53 make the entrance port 61 have the widened shape gradually increasing in width. That is, distances between the second partition 52 and the oblique portions 53b, 53c of the third partition 53 increase from the first partition 51 toward the entrance port 61.

Using movement driving force of the robot 10, the guide device 54 guides the robot 10 along an A direction (hereinafter referred to as an oblique direction A) obliquely extending from the first partition 51 side toward the second partition 52 side. The oblique direction A is at a predetermined acute angle θ set in advance with respect to the Y direction along the second partition 52. Although the predetermined acute angle θ is in an angle range larger than 0 degree and smaller than 90 degrees (0 degrees<θ<90 degrees), an angle range equal to or larger than 15 degrees and smaller than 90 degrees (15 degrees≤θ<90 degrees) is preferable, and an angle range equal to or larger than 30 degrees and equal to or smaller than 60 degrees (30 degrees≤θ≤60 degrees) is optimal. The guide device 54 includes a plurality of guide rollers 62 horizontally disposed on a floor surface G in the region surrounded by the first partition 51, the second partition 52, and the third partition 53. In this case, the floor surface G is horizontal. Although the guide rollers 62 are preferably disposed horizontally, the guide rollers 62 may be disposed at an inclined angle with respect to horizontality. The guide rollers 62 are disposed along the direction inclined at the acute angle θ with respect to the Y direction along the second partition 52. That is, the guide rollers 62 includes a plurality of roller main bodies 62b rotatably supported between a pair of support plates 62a. These guide rollers 62 have rotary center axes extending along a direction that intersects (is perpendicular to) the oblique direction A, and the guide rollers 62 are parallel to one another along the oblique direction A. A plurality of sets of the guide rollers 62 are disposed along the direction perpendicular to the oblique direction A. In other words, the guide rollers 62 are disposed along the oblique direction A in such a manner that rotary center axes of the roller main bodies 62b are parallel to one another.

The power feeding station 50 includes a power feeding device 63 and an air replenishment device 64 that are disposed on the third partition 53. The power feeding device 63 includes a power feeder 65 and a mover 66 to move the power feeder 65. The air replenishment device 64 includes an air replenisher 67 and a mover 68 to move the air replenisher 67. The power feeding device 63 can couple the power feeder 65 to the power feeding coupler 41 of the robot 10 through a cut-away portion 53d of the straight portion 53a of the third partition 53. Similarly, the air replenishment device 64 can couple the air replenisher 67 to the air replenishment coupler 42 of the robot 10 through the cut-away portion 53d of the third partition 53.

The power feeding system (the positioning system) according to the present embodiment includes the robot 10 and the power feeding station 50 described above. Operation of the power feeding system according to the present embodiment will now be described. FIG. 5 to FIG. 11 are schematic diagrams illustrating positioning behaviors of the mobile body at the positioning station. FIG. 12 is a schematic diagram illustrating a positioned state of the mobile body at the positioning station.

As illustrated in FIG. 1, the control device 14 controls the movement device 12 based on map information and distance information so that the robot 10 moves in the petrochemical plant to perform patrol work. When the the charged amount of the battery 13 and the air amount (air pressure) of the air tank 26 decrease, the control device 14 controls the movement device 12 so that the robot 10 moves to the power feeding station 50 to replenish power and air. In this case, the control device 14 may monitor the charged amount of the battery 13 and the air amount of the air tank 26, and when the charged amount and the air amount become equal to or smaller than preset lower limits, the robot 10 may move to the power feeding station 50.

As illustrated in FIG. 1 and FIG. 5, the robot 10 enters the power feeding station 50 through the entrance port 61 while moving rearward. Alternatively, the robot 10 may enter the power feeding station 50 while moving forward depending on positions of the power feeding coupler 41 and the air replenishment coupler 42. At this time, as indicated by the dash-dot-dot lines in FIG. 5, it is preferable that the robot 10 enters between the second partition 52 and the straight portion 53a of the third partition 53. However, as indicated by the solid lines in FIG. 5, the robot 10 is occasionally deviated toward the third partition 53 upon entrance due to a control error. Such an entrance mode of the robot 10 will be described below.

When the robot 10 is deviated toward the third partition 53 upon entrance as indicated by the solid lines in FIG. 5, one end of a rear portion of the robot 10 in a width direction first comes into contact with the second oblique portion 53c of the third partition 53 as illustrated in FIG. 6, and the robot 10 turns clockwise along the second oblique portion 53c. Consequently, as illustrated in FIG. 7, the robot 10 is corrected to a direction along the second oblique portion 53c and moves as it is. Next, as illustrated in FIG. 8, the other end of the rear portion of the robot 10 in the width direction comes into contact with the second partition 52, and the robot 10 turns counterclockwise along the second partition 52. Thus, as illustrated in FIG. 9, the robot 10 is corrected to a direction along the second partition 52 and moves as it is.

Then, as illustrated in FIG. 10, the rear portion of the robot 10 comes into contact with the first partition 51 and becomes unable to move rearward any more. At this time, although the robot 10 is unable to move rearward, the movement device 12 rotates the left and right crawlers 23 so that rotational force of the left and right crawlers 23 causes the guide rollers 62 of the guide device 54 to rotate. Then, the left and right crawlers 23 of the robot 10 rotates while being directed to one side of the Y direction, whereas the guide rollers 62 rotate while facing one side of the oblique direction A. Thus, the robot 10 is guided and moved in the one side of the oblique direction A with rotation of the guide rollers 62. In this case, the guide rollers 62 of the guide device 54 rotate to guide the robot 10 toward the one side of the oblique direction A. Since the left and right crawlers 23 rotate, moving force of the robot 10 in the other side of the Y directions is cancelled, and the robot 10 moves in one side of the X direction. That is, as illustrated in FIG. 11, with the rear end portion of the robot 10 being in contact with the first partition 51, the robot 10 moves in the one side of the X direction, and one side portion of the robot 10 comes into contact with the second partition 52. In other words, even after the rear portion of the robot 10 comes into contact with the first partition 51, the robot 10 continues rearward movement, namely, movement (rotation of the crawlers 23) to move (travel) in the Y direction. It may be regarded that in the rearward movement of the robot 10 after the rear portion of the robot 10 comes into contact with the first partition 51, the guide rollers 62 are rotated by the rearward movement of the robot 10 so that the guide device 54 causes the robot 10 to move along the first partition 51 toward the second partition 52.

At this time, as illustrated in FIG. 2, the detector 43 is disposed at the rear portion of the robot 10. The detector 43 detects that the first contact portion 44 has come into contact with the first partition 51 and outputs a detection result to the control device 14. When a predetermined period of time has elapsed after the first contact portion 44 came into contact with the first partition 51, the control device 14 stops the movement device 12. Consequently, after the first contact portion 44 comes into contact with the first partition 51 and disables the robot 10 from moving rearward, rotation of the guide rollers 62 of the guide device 54 causes the robot 10 to move toward the second partition 52, and after the second contact portion 45 comes into contact with the second partition 52, the left and right crawlers 23 stop moving, thereby completing the positioning of the robot 10.

Thereafter, as illustrated in FIG. 4 and FIG. 12, with the robot 10 being in contact with the first partition 51 and the second partition 52 and positioned, the power feeding device 63 performs power feeding work with respect to the battery 13, and the air replenishment device 64 performs air replenishment work with respect to the air tank 26. At this time, because the robot 10 is in contact with the second partition 52, the robot 10 is not deviated even when the mover 66 presses and couples the power feeder 65 to the power feeding coupler 41 of the robot 10 and even when the mover 68 presses and couples the air replenisher 67 to the air replenishment coupler 42 of the robot 10.

When the power feeding work and the air replenishment work for the robot 10 are completed, the power feeding device 63 and the air replenishment device 64 are decoupled from the robot 10, and the movement device 12 causes the robot 10 to move forward and exit the power feeding station 50.

As described above, the mobile body positioning station according to the present embodiment includes the first partition 51, the second partition 52 disposed along the direction intersecting the extending direction of the first partition 51, and the guide device (the guide) 54 disposed on the movement path of the robot (the mobile body) 10. The guide device 54 is disposed along the oblique direction A with respect to the direction perpendicular to the extending direction of the first partition 51 to extend from the first partition 51 toward the second partition side 52. The guide device 54 is configured to make the robot 10 move in the oblique direction A more easily than move in directions other than the oblique direction A. The guide device 54 is configured to move the robot 10 along the first partition 51 toward the second partition 52.

Consequently, when the robot 10 moves and the rear end portion comes into contact with the first partition 51, the robot 10 stops moving and the positioning in the Y direction is performed. The guide device 54 guides the robot 10 toward the second partition 52 along the oblique direction in which the robot 10 moves easily. Then, when one side portion of the robot 10 comes into contact with the second partition 52, the guide device 54 stops guiding the robot 10, and the positioning of the robot 10 in the X direction and the Y direction is completed. Thus, no sensor to detect the robot 10 is needed so that the configuration can be simplified.

In the mobile body positioning station according to the present embodiment, the guide device 54 causes the robot 10 to move along the first partition 51 toward the second partition 52 after the robot 10 comes into contact with the first partition 51. Consequently, the robot 10 can be positioned highly accurately.

In the mobile body positioning station according to the present embodiment, the guide device 54 is configured to cause the robot 10 to move toward the second partition 52 with use of movement driving force of the robot 10. Consequently, the movement driving force of the robot 10 can make the guide device 54 function to efficiently move and guide the robot 10 toward the second partition 52.

In the mobile body positioning station according to the present embodiment, the oblique direction A is the direction inclined at the predetermined acute angle θ set in advance with respect to the Y direction (first direction) along the second partition 52. Consequently, the movement driving force of the robot 10 can be transmitted to the guide device 54 to efficiently guide the robot 10 toward the second partition 52 and position the robot 10.

In the mobile body positioning station according to the present embodiment, the oblique direction A is set in a range equal to or larger than 15 degrees and smaller than 90 degrees. Consequently, setting of the oblique direction A in the appropriate range makes it possible to position the robot 10 appropriately.

In the mobile body positioning station according to the present embodiment, the extending direction of the first partition 51 and the extending direction of the second partition 52 are arranged to make a right angle. Consequently, the robot 10 that has come into contact with the first partition 51 can be appropriately positioned with respect to the Y direction, and also, the robot 10 that has come into contact with the second partition 52 can be appropriately positioned with respect to the X direction and the Y direction.

In the mobile body positioning station according to the present embodiment, the guide rollers 62 are provided as the guide device 54. The guide rollers 62 are disposed along the oblique direction A. The rotary center axes of the guide rollers 62 extend along the direction intersecting the oblique direction A, and the guide rollers 62 are disposed in parallel to one another. Consequently, the movement driving force of the robot 10 makes the guide rollers 62 rotate so that the rotational force of the guide rollers 62 can efficiently cause the robot 10 to move and be guided toward the second partition 52.

In the mobile body positioning station according to the present embodiment, the third partition 53 is disposed opposite to the second partition 52 and extends along the direction intersecting the extending direction of the first partition 51, and the entrance port 61 of the robot 10 is defined between the end portion of the second partition 52 in the extending direction and the end portion of the third partition 53 in the extending direction. The distance between the second partition 52 and the third partition 53 increases from the first partition 51 toward the entrance port 61. Consequently, even when an entrance position of the robot 10 with respect to the entrance port 61 is deviated in the width direction, the entrance port 61 of the widened shape can appropriately guide the robot 10 inside. An end portion of the guide device 54 may have a slope, for example, as the entrance port 61, thus facilitating entrance and exit of the mobile body.

In the mobile body positioning station according to the present embodiment, the power feeding device 63 for the robot 10 is disposed on the third partition 53. Consequently, with respect to the robot 10 that has come into contact with the first partition 51 and the second partition 52 and been positioned, power feeding is performed from the third partition 53 opposed to the second partition 52 so that the robot 10 can be prevented from being deviated due to coupling of the power feeding device 63, thereby appropriately performing power feeding.

In the mobile body positioning station according to the present embodiment, the air replenishment device 64 for the robot 10 is disposed on the third partition 53. Consequently, with respect to the robot 10 that has come into contact with the first partition 51 and the second partition 52 and been positioned, air replenishment is performed from the third partition 53 opposed to the second partition 52 so that the robot 10 can be prevented from being deviated due to coupling of the air replenishment device 64, thereby appropriately performing air replenishment.

The mobile body positioning system according to the present embodiment includes the control device 14 to control movement of the robot 10 capable of being self-propelled, and the power feeding station 50 for the robot 10. The control device 14 stops movement of the robot 10 when the predetermined period of time has elapsed after the robot 10 came into contact with the first partition 51.

Consequently, after the moving robot 10 comes into contact with the first partition 51 and the positioning in the Y direction is performed, the guide device 54 guides the robot 10 toward the second partition 52 along the oblique direction in which the robot 10 moves easily, and the robot 10 comes into contact with the second partition 52 so that the positioning in the X direction and the Y direction is performed. At this time, the robot 10 stops moving when the predetermined period of time has elapsed after the robot 10 came into contact with the first partition 51 so that the robot 10 can be positioned at an appropriate position.

It is noted that the guide according to the present invention has a configuration that makes the mobile body move in the oblique direction more easily than move in directions other than the oblique direction. In the above-described embodiment, the guide according to the present invention includes the guide rollers 62 but is not limited to this configuration. For example, a sheet including a guide having low friction resistance only along the oblique direction from the first partition toward the second partition may be disposed on the movement path. That is, as illustrated in FIG. 3, this sheet has the guide a surface of which has the lowest friction resistance in the oblique direction A from the first partition 51 toward the second partition 52. In the oblique direction A from the second partition 52 toward the first partition 51 and in a direction intersecting the oblique direction A, surface friction resistance is higher than in the oblique direction A from the first partition 51 toward the second partition 52. When the sheet including the guide that has been subjected to such surface treatment is employed, the mobile body can be appropriately guided and positioned.

In the above-described embodiment, the guide according to the present invention is the guide device 54 driven by the movement driving force of the robot 10 but is not limited to this configuration. The guide may have a function to cause the robot 10 to move in the oblique direction in which the robot 10 moves easily.

In the above-described embodiment, the first partition 51, the second partition 52, and the third partition 53 are continuous surfaces in the X direction and the Y direction but are not limited to this configuration. For example, the first partition 51, the second partition 52, and the third partition 53 are not made continuous but may have gaps therebetween. Alternatively, the first partition 51, the second partition 52, and the third partition 53 may be composed of a plurality of columns disposed at a predetermined interval in the X direction and the Y direction. Alternatively, the first partition 51 and the second partition 52 may be provided whereas the third partition 53 may be eliminated. The robot 10 as the mobile body includes the first contact portion 44 and the second contact portion 45, where the robot 10 comes into contact with the first partition 51 and the second partition 52. However, the frame 11 of the robot 10 may directly come into contact with the first partition 51 and the second partition 52.

In the above-described embodiment, the robot 10 as the mobile body is self-propelled when the onboard control device 14 controls the movement device 12. However, the robot 10 as the mobile body may be self-propelled by remotely controlling the movement device 12.

In the above-described embodiment, the positioning station according to the present invention positions the robot 10 as the mobile body for the purposes of feeding power and replenishing air to the robot 10. However, instead of such work, positioning may be performed, for example, to load and unload packages in and from the mobile body.

In the above-described embodiment, the mobile body positioning station and the mobile body positioning system according to the present invention are applied to patrol inspection work in the petrochemical plant but may be applied to nuclear power plants, pharmaceutical plants, steel plants, various kinds of manufacturing plants, and other facilities, and may be also applied to work, such as disaster prevention and relief work and building maintenance work.

REFERENCE SIGNS LIST 10 robot (mobile body)
11 frame
12 movement device
13 battery
14 control device
15 internal pressure explosion-proof device
16 camera
17 communication device
21 electric motor
22 drive sprocket
23 crawler
24 air supplier
25 exhaust device
26 air tank
28 air supply line
29 pressure reducing valve
32 relief valve
31 air discharge line
41 power feeding coupler
42 air replenishment coupler
43 detector
44 first contact portion
45 second contact portion
50 power feeding station (positioning station)
51 first partition
52 second partition
53 third partition
54 guide device (guide)
61 entrance port
62 guide roller
63 power feeding device
64 air replenishment device
65 power feeder
66, 68 mover
67 air replenisher

The invention claimed is:

1. A mobile body positioning station comprising:
a first partition;
a second partition disposed along a direction intersecting an extending direction of the first partition; and
a guide disposed on a movement path of a mobile body, wherein
the guide comprises a plurality of guide rollers horizontally disposed along an oblique direction with respect to a direction perpendicular to the extending direction of the first partition to extend from the first partition toward the second partition side, the guide rollers having rotary center axes extending along a direction that is perpendicular to the oblique direction, and
the guide rollers are configured to be rotated by reward or forward movement of the mobile body so that the guide rollers cause the mobile body, which is in the reward or forward movement after the mobile body comes into contact with the first partition, to move along the first partition toward the second partition;
the mobile body positioning station further comprising a third partition facing the second partition and disposed along a direction intersecting the extending direction of the first partition; and
an entrance port of the mobile body defined between an end portion of the second partition in the extending direction and an end portion of the third partition in the extending direction, wherein a distance between the second partition and the third partition increases from the first partition toward the entrance port;
a power feeding device for the mobile body disposed on the third partition; and
an air replenishment device for the mobile body disposed on the third partition.

2. The mobile body positioning station according to claim 1, wherein the oblique direction is a direction inclined at a predetermined acute angle set in advance with respect to an extending direction of the second partition.

3. The mobile body positioning station according to claim 1, wherein the oblique direction is set in a range equal to or larger than 15 degrees and smaller than 90 degrees.

4. The mobile body positioning station according to claim 1, wherein the first partition and the second partition are disposed in such a manner that the extending direction of the first partition and an extending direction of the second partition make a right angle.

5. The mobile body positioning station according to claim 1, wherein
the guide rollers are disposed in parallel to one another.

6. The mobile body positioning station according to claim 1, wherein
the guide rollers comprise:
a pair of support plates; and
at least one roller main body,
the pair of support plates is disposed along the oblique direction, and
the at least one of roller main bodies is rotatably disposed by a rotary shaft perpendicular to the support plates.

7. A mobile body positioning system comprising:
a control device configured to control movement of the mobile body capable of being self-propelled; and
the mobile body positioning station according to claim 1, wherein
the control device stops movement of the mobile body when a predetermined period of time has elapsed after the mobile body comes into contact with the first partition.

* * * * *